(12) United States Patent
Wichmann et al.

(10) Patent No.: US 10,864,610 B2
(45) Date of Patent: Dec. 15, 2020

(54) SWARF CONTAINER FILLER AND METHOD

(71) Applicant: DADCO, Inc., Plymouth, MI (US)

(72) Inventors: Hans E. Wichmann, Plymouth, MI (US); David J. Gretka, II, Dearborn, MI (US); Carleton D. Hall, Brighton, MI (US)

(73) Assignee: DADCO, INC., Plymouth, MI (US)

( * ) Notice: Subject to any disclaimer, the term of this patent is extended or adjusted under 35 U.S.C. 154(b) by 36 days.

(21) Appl. No.: 16/360,542

(22) Filed: Mar. 21, 2019

(65) Prior Publication Data

US 2020/0298360 A1 Sep. 24, 2020

(51) Int. Cl.
*B23Q 11/00* (2006.01)

(52) U.S. Cl.
CPC ................. *B23Q 11/0067* (2013.01)

(58) Field of Classification Search
CPC .................................................. B23Q 11/0067
See application file for complete search history.

(56) References Cited

U.S. PATENT DOCUMENTS 4,433,055 A * 2/1984 Kany .................... C05F 17/939
435/290.4

* cited by examiner

*Primary Examiner* — Craig M Schneider
*Assistant Examiner* — Jason K Niesz
(74) *Attorney, Agent, or Firm* — Reising Ethington PC; William H. Francis

(57) ABSTRACT

A process and machine for filling a container with a top opening with swarf. The machine may include an apparatus to deposit a pile of swarf in the container with a portion of the pile extending above the top opening, a blade extending laterally across this portion and an actuator configured to move the blade across at least part of the pile to move at least part of the top portion of the pile into the container and desirably below the top opening.

21 Claims, 4 Drawing Sheets

* SWARF CONTAINER FILLER AND METHOD

TECHNICAL FIELD

This invention relates to swarf produced by machining operations and particularly to the filling of containers with swarf produced by machining of metal and plastic workpieces.

BACKGROUND

Industrial and commercial machining operations produce large quantities of metal and plastic swarf typically in the form of turnings, filings, shavings, chips and the like. This swarf must be removed from the machining operations typically on a substantially continuous basis and is usually deposited by a conveyor or the like into a container or bin typically with either an open top or an opening through its top which may be opened and closed with a cover or the like.

Typically, when metal and plastic swarf is dumped by a conveyor or the like into a container it tends to produce in the container a pile of swarf with a generally conical configuration which does not fill the container and extends generally vertically above the top of the container and unless redistributed will extend upwardly to the outlet area of discharge of swarf of the conveyor. If a machine producing swarf throughout a long period of operation is attended to by an operator, the operator will periodically manually move a portion of the swarf into unfilled areas of the container until is substantially completely full.

However, computer numerically controlled (CNC) machines such as CNC lathes, boring and milling machines can operate automatically typically for 20-24 hours or more without an operator or other attendant. When CNC machines operate autonomously for a long period of time without an operator the waste or swarf must be properly managed and not allowed to accumulate in the machining zone to the point of damaging the machine or its tooling and if automatically removed from this machine by a conveyor or the like needs to be transferred to a container of sufficient size or capacity so that it does not overflow the container and/or back up to or into the outlet of the conveyor throughout period of autonomous operation of the machine without an operator or other attendant.

SUMMARY

In at least some implementations, swarf may be stored in a container with a top opening by the process of discharging swarf into the container from above the top opening to produce a pile of swarf in the container and extending generally vertically above the top opening of the container, disposing a blade adjacent the pile with a lower edge extending laterally across the pile and adjacent the top opening of the container, and moving the blade across the pile of swarf to distribute at least a portion of the pile of swarf above the top opening into the container and below or substantially at the top opening of the container. In at least some implementations, the blade may be moved from a starting position spaced from the portion of the pile of swarf above the top opening in one direction across at least part of the pile of swarf and in a generally opposed direction to return the blade to its starting position. In at least some implementations, the blade may be only intermittently moved across at least a portion of the pile of swarf and desirably after a predetermined period of time. In at least some implementations, it may be determined when the pile of swarf reaches a predetermined height above the top opening of the container and in response to such determination the blade may be moved across at least part of the of the pile of swarf to move at least a portion of the swarf above the top opening of the container to distribute that portion into the container and below or substantially at the top opening of the container. In at least some implementations, the process may include interrupting the delivery of swarf to the container at least while the blade moves across the pile of swarf and thereafter continuing the delivery of swarf to the container. In at least some implementations, it may be determined if the container is substantially full and, if so, discontinuing the delivery of swarf to the container and/or discontinuing operation of the machine producing the swarf.

In at least some implementations a machine for filling with swarf a container with a top opening may include an apparatus constructed and arranged to discharge swarf into the container from above its top opening to produce a pile of swarf in the container and extending above its top opening, a blade with a lower edge adjacent the top opening and extending laterally across at least the portion of the swarf above the top opening, and an actuator connected to the blade and constructed and arranged to move the blade across at least part of the pile of swarf to distribute at least a portion of the swarf above the top opening into the container and below or substantially at the top opening of the container. In at least some implementations, the actuator may be constructed and arranged to move the blade from a starting position in one direction across at least part of the pile of swarf and in a generally opposite direction to return the blade to the starting position. In some implementations, the actuator may be a hydraulic, pneumatic, electric or mechanical actuator.

In at least some implementations, the blade may have a width of at least 8/10ths of the width of the top opening parallel to the blade. In at least some implementations the blade may have a planar portion extending over at least 7/10ths of the height of the blade substantially transverse to the width of the blade. In at least some implementations, the blade may be curved over at least a portion and desirably at least 7/10ths of the height of the blade.

In at least some implementations, the machine may include an electrical or electronic controller controlling the actuator to intermittently move the blade across at least part of the pile of swarf. In some implementations, the controller may control the actuator to move the blade across at least part of the pile of swarf after a predetermined period of time which may have been empirically determined to be the amount of time swarf was discharged from above the container to produce a predetermined desired part of the pile of swarf extending above the top of the container. In at least some other implementations the machine may include a sensor of the height of the pile of swarf above the top of the container and an electronic controller using a signal from this sensor to control the actuator to move the blade across at least part of the pile of swarf when the top of the pile reaches a predetermined height above the top opening of the container. In at least some implementations the controller may interrupt the apparatus from delivering swarf to the container at least while the actuator moves the blade across at least a part of the pile of swarf. In at least some implementations the machine may also comprise a sensor indicating when the container is at least substantially full of swarf and the electronic controller may use such a signal to initiate a shutdown of the machine producing the swarf.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

A process of filling a container with swarf may include depositing swarf from above a top opening of a container into a pile of swarf in the container and extending above the top opening, moving a blade into engagement with at least a portion of the pile of swarf extending above the top opening and generally across at least part of the pile below the blade to deposit at least a portion of the swarf from above the top opening into the container and below or substantially at a lower edge of the blade. The process may include so moving the blade after each of a plurality of a predetermined period of time or after each of a plurality of predetermined periods of time. The process may include detecting when the pile of swarf is at a predetermined height above the top opening of the container and so moving the blade in response thereto. The process may also include detecting when the swarf in the container is at a predetermined desired extent of filling of the container with swarf and stopping the depositing of more swarf into the container and/or stopping the machine producing the swarf.

Figure 1:
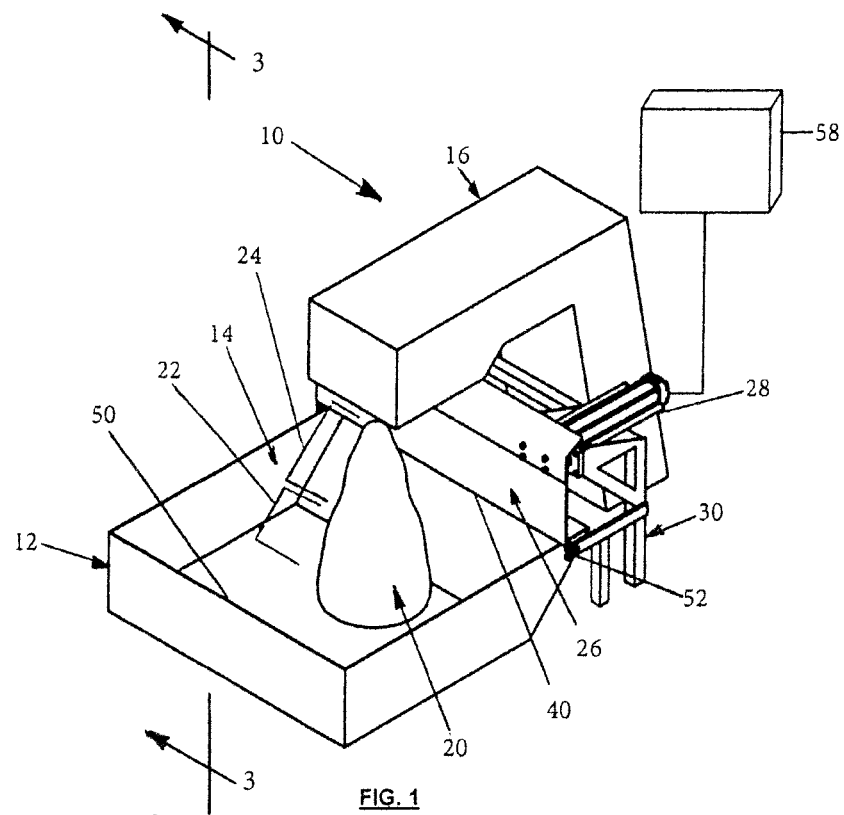
FIG. 1 is a somewhat schematic isometric view of the machine for filling a container with swarf with a blade shown in a retracted position.
Figure 2:
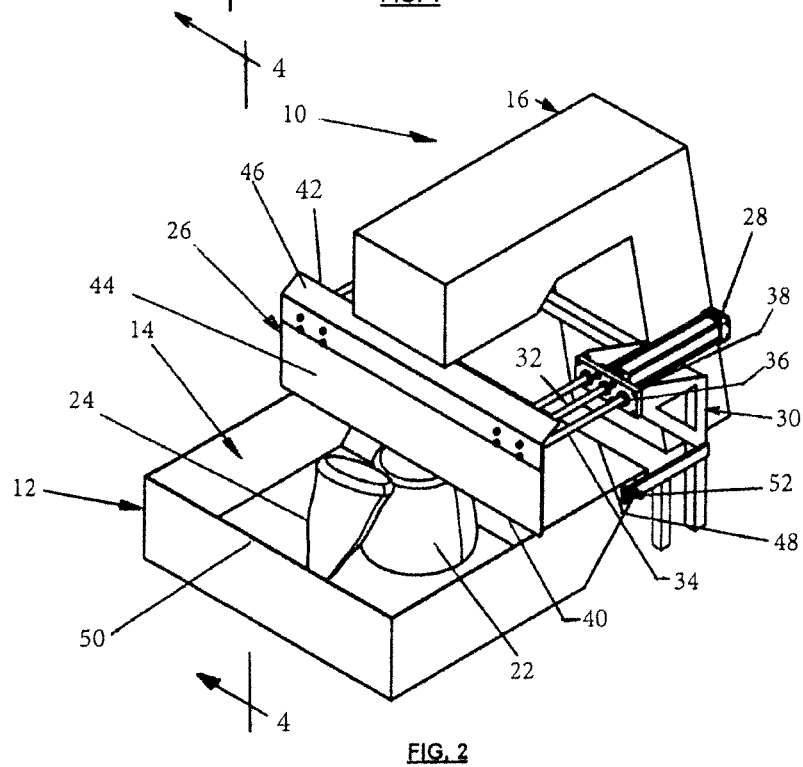
FIG. 2 is a somewhat schematic isometric view of the machine of FIG. 1 with the blade at least partially extended and pushing a portion of the pile of swarf above an open top of a container into the container.
Figure 3:
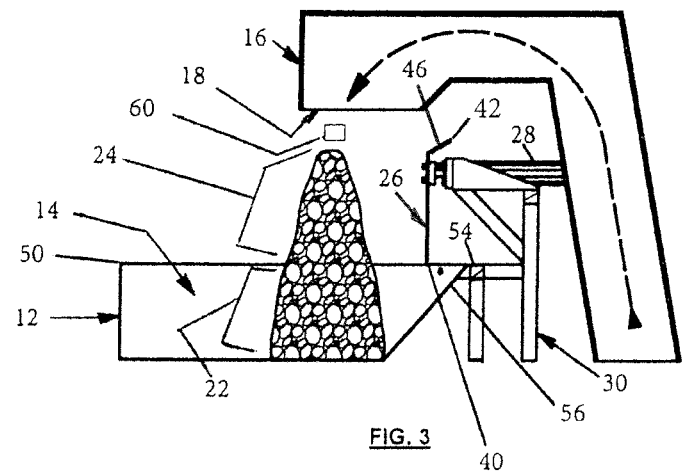
FIG. 3 is a somewhat schematic sectional view taken generally on line 3-3 of FIG. 1.
Figure 4:
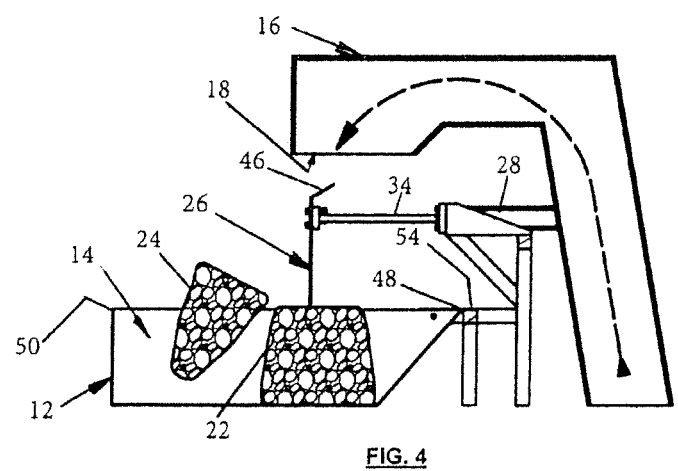
FIG. 4 is a somewhat schematic sectional view taken generally on line 4-4 of FIG. 2.
Figure 5:
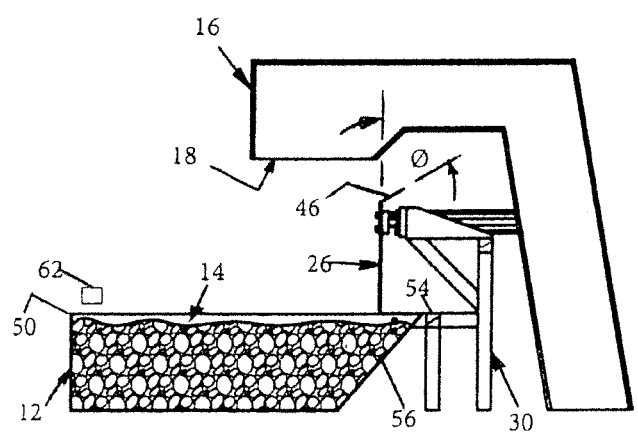
FIG. 5 is a somewhat schematic view of a container which has been substantially completely filled with swarf by the machine of FIG. 1.

Referring in more detail to the drawings, FIGS. 1 and 2 illustrate a suitable apparatus or machine 10 for filling a bin or container 12 having a top opening 14 with swarf produced by machining operations. Typically, swarf may be produced by a computer numerical controlled (CNC) machine such as a milling, boring, or turning machine, removed from its machining zone, and delivered by a conveyor system 16 shown schematically in the drawings. The conveyor system 16 may have an outlet 18 overlying and disposed generally vertically above the top opening 14 of the container. In operation the conveyor system may produce a pile of swarf 20 with a lower portion 22 received within the container and an upper portion 24 extending generally vertically above the top-opening of the container. Swarf by itself is not equally distributed throughout the container. To move into the container at least part of the upper portion of swarf, the machine may have a blade 26 which may be moved across at least part of the container 12 by one or more pneumatic or hydraulic cylinders 28 carried by a support frame 30 which typically may rest on a floor. As shown in FIG. 5 to distribute the upper surface of the swarf at substantially the same distance or height above the bottom of the container it may be desirable in some situations for the blade to be moved across the top opening of the container from substantially its leading edge to its trailing edge. The blade may be attached to a piston rod 32 of the cylinders 28 and desirably also attached to one end of guide rods 34 slidably received in bushings 36 mounted on a plate 38 carried by the frame and to which a cylinder 28 is also attached.

The blade 26 may have a lower edge 40 disposed above and desirably closely adjacent to the top opening 14 of the container, and an upper edge 42 which may be vertically spaced below the outlet 18 of the conveyor system. The blade may have a lower portion 44 which may be planar as shown or curved with the lower edge closer to the pile 20 then the middle of the curved portion. To inhibit swarf discharged by the conveyor system 16 from falling or flowing onto the cylinders 28 and guide rods 34 when the blade 26 is in its retracted position as shown in FIG. 1, an upper portion 46 of the blade may be inclined rearwardly relative to the lower portion 44 of the blade and desirably at an acute included angle Ø desirably in the range of 20-70 degrees relative to the plane of the lower portion 44 of the blade (as shown in FIG. 5). As the blade is extended to move at least part of the upper portion 24 of the swarf pile 20 into the container, if the upper edge 42 of the blade is closely adjacent to the outlet 18 of the conveyor system the upper portion 46 may also tend to direct swarf emerging from this outlet onto the blade and into the container. Desirably the blade may extend transversely across the width of at least the upper portion 24 of the pile 20 of swarf and desirably extends at least 70% and desirably 90% of the width of the top opening 14 of the container and preferably across the entire width of the top opening. In its retracted position the blade may be closely adjacent to one edge such as the front edge 48 of the top opening 14 of the container 12 and if desired in its fully extended position may be closely adjacent to a generally opposed edge of the top opening such as the rear edge 50.

As shown in the drawings, the blade 26 may be in an angularly fixed position relative to the guide rods (such as at a right angle) and/or the container. Alternatively, if desired the blade may be hinged or pivotly mounted relative to the guide rods 34 so that as the cylinders 28 move the blade in one direction it engages the swarf pile 20 and in the opposite direction the blade may pivot or ratchet with the lower edge moving upward relative the container so that the blade may more freely pass over the swarf in the opposite direction such as during part of the retraction of the blade. In some circumstances this may reduce or prevent swarf from spilling out of the container during a cycle of movement of the blade.

Desirably, the container may be releasably connected to the frame of the machine such as by plunger pin latches 52 carried by the frame 30 and receivable in recesses, holes, sockets or the like fixed to the container. Alternatively, if desired, the frame 30 may be secured in place relative to the conveyor system 16 such as being attached to a floor with the container resting on the floor and its leading edge being pushed into or placed in engagement with suitable stop carried by the frame such as a bar 54 carried by the frame and extending longitudinally across a leading end portion 56 of the container. Alternatively, the frame could be mobile or movable relative to the floor and in use the container could be releasably connected to the frame. In some applications this mobile frame arrangement might require a suitable counterweight carried by the frame and it may be desirable to reverse the direction of movement of the blade in which it moves swarf into the container.

Figure 7:
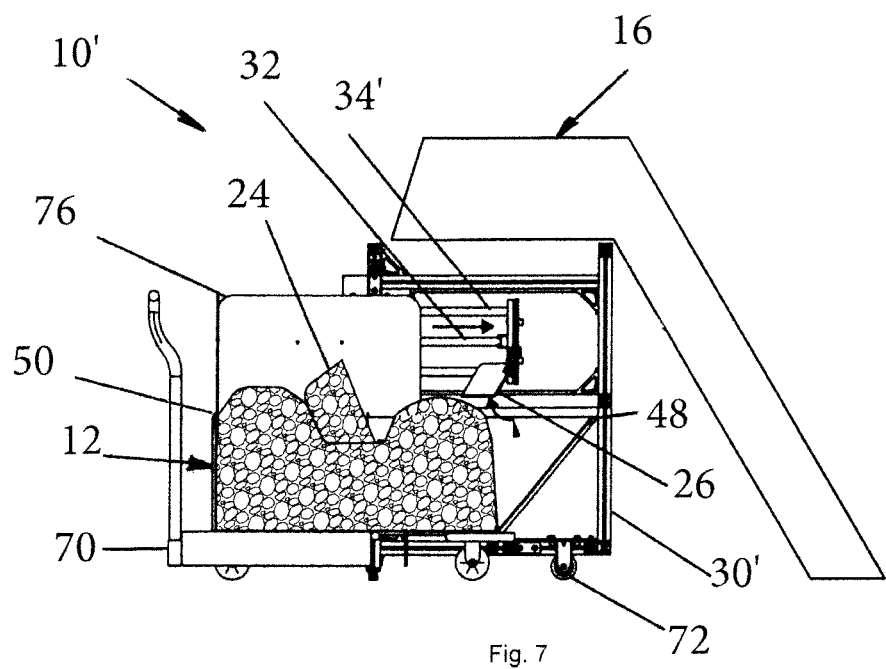
FIG. 7 is a somewhat schematic sectional view taken generally on line 7-7 of FIG. 6 with the blade shown moving toward its fully retracted position.

FIG. 7 illustrates a mobile or movable apparatus or machine 10' for filling a bin or container 12 having a top opening 14 with swarf produced by machining operations and discharged from the conveyor system 16. This container may be received on a conventional flat bed dolly 70 to facilitate moving the container into and out of the machine 10'. This machine has a frame 30' mounted on casters 72 so that this machine is movable relative to the floor on which it is received and may be moved from one conveyor system to another as desired. The container may be retained in a predetermined desired position in the machine 10' such as by toggle latches 74 carried by the frame and engageable with the container. These latches may be mechanical or magnetic or solenoid actuated as may be desired for a particular application. Optionally spill shields 76 may be removably carried by or fixed to the container 12.

Figure 8:
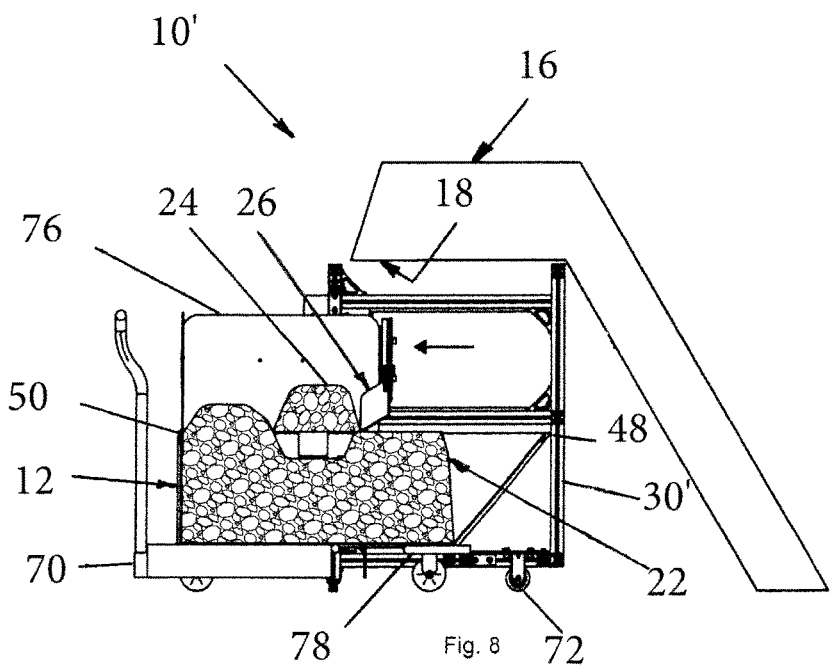
FIG. 8 is a somewhat schematic view similar to FIG. 7 and showing the blade moving toward its fully extended position.

In this machine 10' the blade 26 may be moved across at least part of the container 12 by one or more hydraulic cylinders 28 which may be in a reversed orientation relative to the cylinders 28 of the machine 10 so that when fully extended they dispose the blade adjacent the leading edge 48 of the container and as they are retracted they move the blade toward the rear edge 50 of the top opening of the container. To maintain the machine 10' in a stationary position when in use a counterbalance 78 may be carried by the frame and the casters 72 may include suitable releasable locks preventing rotation of their wheels. The blade 26 may be hinged or pivotably mounted relative to the cylinder 28 and guide rods 34 so that as shown in FIG. 7 as the cylinder rods 32 are extended to move the blade in one direction it pivots or ratchets with its lower edge 40 moving upward relative to the container 12 so that the blade freely passes over the swarf as it moves to its fully extended position. As the cylinder rods 32 move in the opposite direction and retract the blade it moves to a generally vertical position shown in FIG. 8 and engages at least a portion 24 of the swarf pile 20 above the top opening 14 of the container and moves this swarf into the container 12 to distribute the upper surface of the swarf at substantially the same distance or height above the bottom of the container and desirably below or only slightly above the top opening of the container.

Figure 6:
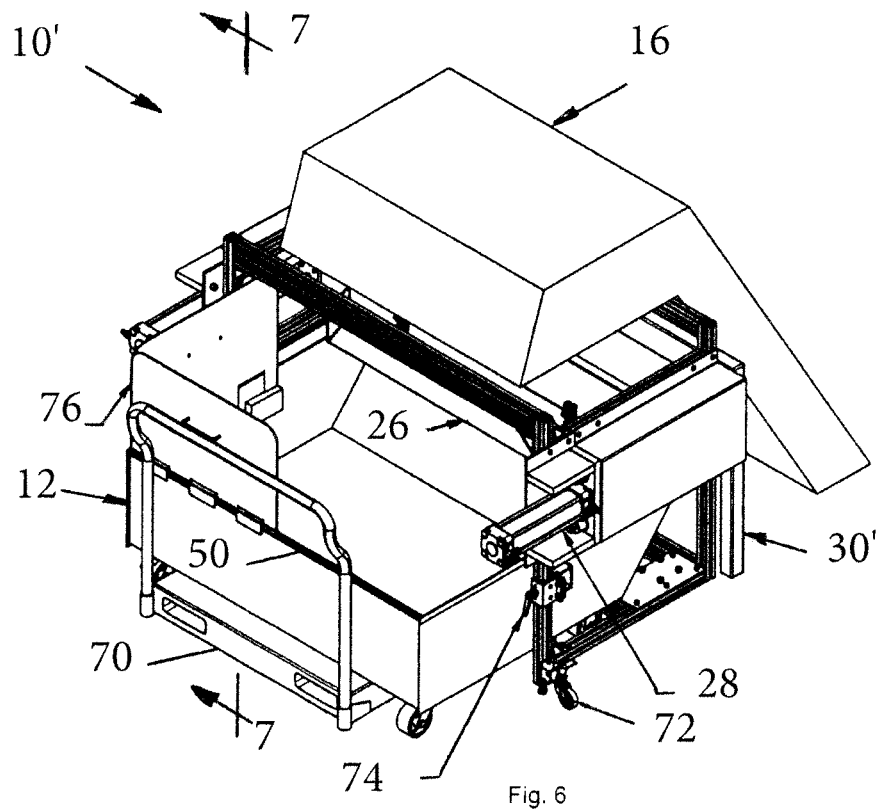
FIG. 6 is a somewhat schematic isometric view of a mobile machine for filling a container with swarf with a blade shown in a retracted position.
Figure 9:
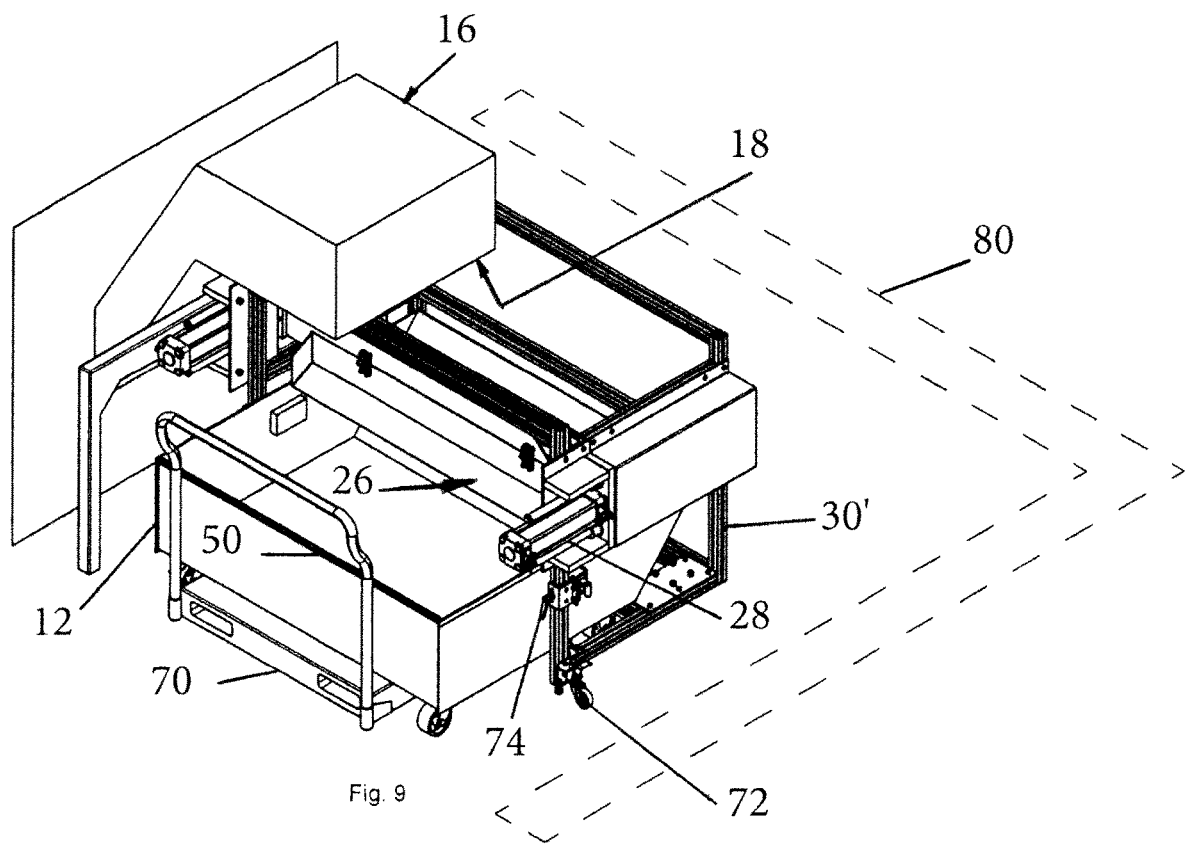
FIG. 9 is a somewhat schematic isometric view of the machine of FIG. 6 shown in an alternate position relative to a conveyor system for filling a container with swarf.

As shown in FIG. 9, this mobile machine 10' may be oriented in a position relative to the conveyor 16 which is circumferentially at substantially a right angle to the position shown in FIG. 6 when walls or other barriers 80 (shown in broken lines) limit access for inserting a container into and removing it from the machine 10'. In some applications this orientation relative to the conveyor 16 may not allow for completely filling the container 12 with swarf but it does permit use of the machine 10' in cramped floor layouts which would otherwise prevent removal of the container and thus use of the machine 10' if it were oriented as shown in FIG. 6 relative to the conveyor 16. It will be apparent that this alternative orientation relative to the conveyor 16 may also be used with the machine 10.

The cycling of the filling machines 10 and 10' may be controlled by a suitable timer and/or electronic controller 58 which if desired may be part of a control panel. The period of time may be empirically determined for an operating machine, such as a CNC machine, to produce a desired height of the portion 24 of a swarf pile 20 above the top opening of a container 12. This empirical period of time may then be entered into the timer or electronic controller to cycle the blade 26 after each such period of time to dispose at least part of the upper portion 24 of a swarf pile 20 into the container. Typically the controller initiates and controls actuation of the cylinders 28 to carry out one or more cycles of extending and retracting the blade 26 for each time period. With this use of a time period the container 12 needs to have sufficient volume or capacity to receive and retain all the swarf produced by a CNC machine throughout at least an entire period of time it produces swarf without an operator or other attendant removing the container and desirably replacing it with an empty container to receive further swarf. The size or capacity of the container will at least in part be a function of the quantity and rate at which the CNC machine produces swarf and the length of time the CNC machine will be operated without an attendant or operator present to monitor and if need be interrupt operation of the CNC machine and/or remove a container full of swarf and replace it with an empty container to receive swarf when operation of the CNC machine is resumed or restarted.

Another approach for controlling the operation of machines 10 and 10' for filling containers 12 with swarf may be providing a sensor 60 to determine when the upper portion 24 of a pile 20 of swarf has reached a predetermined desired height above the top opening 14 and using this sensor determination to initiate cycling of the blade 26 by the cylinders 28 to move at least a portion of the pile of swarf above the top opening into the container by executing one or more cycles of the blade. If desired another sensor 62 may be used to determine when the container has been filled to a desired level and to stop or pause machining operations of a CNC machine from producing further swarf at least until the full container of swarf has been removed and an empty container provided for receiving swarf produced by resumption of operation of the CNC machine. Suitable sensors 60 and 62 may include proximity, photoelectric, hall effect, switches or the like.

Other approaches, schemes and software for controlling the operation of the container filling machines 10 and 10' will be apparent to one of ordinary skill in the art and thus the control schemes described herein are not intended to be exhaustive and others may be readily developed by one of ordinary skill in the art.

It should be appreciated that one of ordinary skill in the art will recognize other embodiments encompassed within the scope of this invention. The arrangements shown and described above are merely illustrative and not a complete or exhaustive list or representation. Of course, still other embodiments and implementations can be achieved in view of this disclosure. The embodiments described above are intended to be illustrative and not limiting the scope or spirit of the invention. The invention is defined by the claims that follow.

The invention claimed is:

1. A machine for filling with swarf a container with a top opening comprising:
    an apparatus constructed and arranged to dispose swarf in a container from above a top opening of the container to provide a pile of swarf in the container and extending vertically above the top opening;
    a blade with a lower edge extending laterally across the pile and adjacent the top opening of the container;

an actuator connected to the blade and constructed and arranged to move the blade across at least part of the pile of swarf to distribute at least a portion of the pile of swarf above the top opening into the container and below or substantially at the top opening of the container; and an electronic controller controlling the actuator to intermittently move the blade across the pile of swarf.

2. The machine of claim 1 wherein the actuator is constructed and arranged to move the blade from a starting point in one direction across the pile of swarf and in an opposed direction to return the blade to the starting position.

3. The machine of claim 1 wherein the actuator comprises a hydraulic, pneumatic, electric or mechanical actuator.

4. The machine of claim 1 wherein the actuator comprises at least one cylinder.

5. The machine of claim 1 wherein the blade has a width of at least 0.9 of the width of the top opening of the container parallel to the blade.

6. The machine of claim 1 wherein the blade has a planar portion extending over at least 0.8 of the height of the blade.

7. The machine of claim 1 wherein the blade is curved over at least 0.7 of the height of the blade.

8. The machine of claim 1 wherein the blade has an upper edge and an adjacent edge portion inclined at an acute included angle in the range of 10° to 70° to a lower portion of the blade adjacent the lower edge of the blade.

9. The machine of claim 1 wherein the blade is pivotally mounted so that when the actuator moves the blade in one direction it may engage the pile of swarf to move at least a portion of the pile of swarf into the container and when the actuator moves the blade in an opposite direction the blade may pivot to move its lower edge upward relative to the container so that the blade may more freely pass over the swarf.

10. The machine of claim 1 wherein the controller controls the actuator to move the blade across the pile of swarf after a predetermined period of time.

11. The machine of claim 1 wherein the controller interrupts the apparatus from delivering swarf to the container at least while the actuator moves the blade across the pile of swarf.

12. The machine of claim 1 which also comprises a sensor providing a signal that the container is at least substantially full of swarf and the electronic controller receives such signal and initiates a shutdown of the machine producing the swarf.

13. The machine of claim 1 which also comprises a sensor of the height of the pile of swarf and the electronic controller using a signal of the sensor to control the actuator to move the blade across the pile of swarf when the pile of swarf reaches a predetermined height above the top opening of the container.

14. The machine of claim 13 wherein the controller interrupts the apparatus from delivering swarf to the container at least while the actuator moves the blade across the pile of swarf.

15. The machine of claim 13 which also comprises a sensor providing a signal that the container is at least substantially full of swarf and the electronic controller receives such signal and initiates a shut down of the machine producing the swarf.

16. A process for filling a container with swarf, comprising:

providing a container with a top opening;

depositing from above the top opening swarf into a pile in the container and extending above the top opening; and moving a blade into engagement with at least part of a portion of the pile of swarf extending above the top opening and generally across at least part of a portion of the pile below the blade to deposit at least part of the swarf from above the open top opening into the container and below or substantially at a lower edge of the blade.

17. The process of claim 16 wherein the blade is intermittently moved after each of a plurality of a predetermined period of time.

18. The process of claim 16 which also comprises detecting when the swarf in the container is at a predetermined extent of filling the container with swarf and in response thereto stopping the depositing of more swarf into the container.

19. The process of claim 16 which also comprises detecting when the pile of swarf is at a predetermined height above the top opening of the container and in response thereto moving the blade.

20. The process of claim 19 which also comprises detecting when the swarf in the container is at a predetermined extent of filling the container with swarf and in response thereto stopping the depositing of more swarf into the container.

21. A machine for filling with swarf a container with a top opening comprising:

an apparatus constructed and arranged to dispose swarf produced by a machining operation into a container from above a top opening of the container to provide a pile of swarf in the container and extending vertically above the top opening;

a blade with a lower edge extending laterally across at least a portion of the pile of swarf extending above the top opening and with the lower edge adjacent the top opening of the container;

an actuator connected to the blade and constructed and arranged to move the blade horizontally across at least part of the pile of swarf to distribute at least a portion of the pile of swarf above the top opening into the container and below or substantially at the top opening of the container; and an electric or electronic controller for controlling the actuator to intermittently move the blade across at least part of the pile of swarf.

* * * * *